(12) United States Patent
Kondou et al.

(10) Patent No.: US 8,122,584 B2
(45) Date of Patent: Feb. 28, 2012

(54) METHOD OF PRODUCING HONEYCOMB STRUCTURE MOLDING DIE

(75) Inventors: Toshiji Kondou, Handa (JP); Yuji Yamada, Toyoake (JP); Kunitsugu Mototani, Kariya (JP)

(73) Assignee: Denso Corporation, Kariya (JP)

( * ) Notice: Subject to any disclaimer, the term of this patent is extended or adjusted under 35 U.S.C. 154(b) by 1097 days.

(21) Appl. No.: 12/003,417

(22) Filed: Dec. 26, 2007

(65) Prior Publication Data
US 2008/0156061 A1    Jul. 3, 2008

(30) Foreign Application Priority Data
Dec. 27, 2006  (JP) ................................. 2006-351419

(51) Int. Cl.
*B23P 13/04*    (2006.01)
(52) U.S. Cl. ............. 29/558; 29/557; 29/592.1; 29/854; 29/856; 72/324
(58) Field of Classification Search .................... 29/557, 29/558; 72/324
See application file for complete search history.

(56) References Cited

U.S. PATENT DOCUMENTS

| 5,906,839 | A  |   | 5/1999 | Miura et al. |
| 6,290,837 | B1 |   | 9/2001 | Iwata et al. |
| 6,732,621 | B2 | * | 5/2004 | Iwata et al. ........................ 83/51 |
| 7,163,389 | B2 | * | 1/2007 | Miyazaki et al. ............. 425/380 |

FOREIGN PATENT DOCUMENTS

| JP | 60127970 A | * | 7/1985 |
| JP | 03149183 A | * | 6/1991 |
| JP | 07-001464 |   | 1/1995 |
| JP | 09-094813 |   | 4/1997 |
| JP | 11-058337 |   | 3/1999 |
| JP | 11-058407 |   | 3/1999 |

* cited by examiner

*Primary Examiner* — Derris Banks
*Assistant Examiner* — Azm Parvez
(74) *Attorney, Agent, or Firm* — Nixon & Vanderhye PC

(57) ABSTRACT

In a method of producing a honeycomb structure molding die composed of feed holes through which molding material is fed and slit grooves communicated with the feed holes for the use of molding a honeycomb structure body, the slit grooves are formed on one surface of a metal material in a lattice arrangement by repeatedly moving a thin circular grindstone blade which is rotating in a straight-line direction or a line direction approximating a straight line in order to cut the surface of the metal material. In particular, the method removes fine metal powder, generated by cutting the surface of the metal material, using polishing grooves formed in a dressing grindstone disposed in front of the metal material every cutting of the metal material during the slit groove formation.

4 Claims, 6 Drawing Sheets

METHOD OF PRODUCING HONEYCOMB STRUCTURE MOLDING DIE

CROSS-REFERENCE TO RELATED APPLICATION

This application is related to and claims priority from Japanese Patent Application No. 2006-351419 filed on Dec. 27, 2006, the contents of which are hereby incorporated by reference.

BACKGROUND OF THE INVENTION

1. Field of the Invention

The present invention relates to a method of producing or machining a honeycomb structure molding die such as an extrusion die which is designed to form a honeycomb structure body of ceramic material employed as a catalyst carrier of an exhaust gas purifying filter for motor vehicles.

2. Description of the Related Art

For example, a honeycomb structure body is applicable to an exhaust gas purifying filter for motor vehicles. The honeycomb structure body is produced by extrusion molding using a honeycomb structure body molding die (hereinafter, will also be referred to as the "molding die" for short).

In general, such a molding die has a plurality of feed holes and a plurality of slit grooves (as thin grooves or slots). The slit grooves are formed in a lattice arrangement and communicate with the feed holes. Molding material such as ceramic material is supplied through the fed holes of the molding die. The molding material is then shaped in a honeycomb structure body by extrusion molding through a plurality of slit grooves of the molding die.

There are related art documents disclosing a method of producing such a honeycomb structure molding die to be used in extrusion molding, for example, Japanese patent No. 3750348 and Japanese patent No. 3814849.

In the related art method of producing or machining a molding die, metal material such as a die material is firstly prepared. A plurality of feed holes is then formed in the metal material from one end surface with a predetermined depth so as to not reach the other surface of the metal material, namely, not pass through the metal material. Following, a plurality of slit grooves is made in a lattice arrangement in the other surface side by cutting the other surface of the metal material using a thin circular grindstone blade as a cutting tool. The slit grooves are thereby communicated with the feed holes in the molding die.

However, such a related art method of producing or machining the honeycomb structure molding die involves the possibility of generating and attaching fine metal powder produced by cutting the metal material (die material) using the thin circular grindstone blade as the cutting tool. As a result, the slit grooves are thereby formed in a zigzag direction, not formed in a straight-line direction or a line direction approximating a straight line, in the molding die. Further, the related art method involves the possibility of generating thermal energy by friction between fine metal powder (generated by cutting the metal material) attached to the thin circular grindstone blade and the metal material as the die material to be worked, and the possibility of the thin circular grindstone blade seizing. As a result, the thin circular grindstone blade is broken and slit grooves of a wide width, wider than a desired width, are made in the molding die. It is therefore difficult for the related art methods to produce the honeycomb structure molding die according to its blueprint or specification.

SUMMARY OF THE INVENTION

It is an object of the present invention to provide an improved method of producing or machining a honeycomb structure molding die, such as an extrusion die which is designed to form a honeycomb structure body, having a plurality of slit grooves (or thin grooves or slots) of a desired shape, and which is capable of preventing a thin circular grindstone blade from breaking during the cutting process of making the slit grooves in a metal material (or a die material).

To achieve the above purposes, the present invention provides a method of producing a honeycomb structure molding die for the use of molding a honeycomb structure body. The die has a plurality of fed holes and a plurality of slit grooves. Molding material is fed through the feed holes. The slit grooves are formed approximately in a lattice arrangement and communicated with the corresponding feed holes. The method has the following steps: the step of preparing a metal material of a plate shape having a feed hole formation surface in which the feed holes will be formed and a slit groove formation surface in which the slit grooved will be formed; the step of forming the feed holes with a depth in the feed hole formation surface toward the slit groove formation surface of the metal material without penetrating the metal material; the step of forming the slit grooves of a straight-line shape or a line shape approximating a straight line in the slit groove formation surface of the metal material in approximating a lattice arrangement while moving or shifting a thin circular grindstone blade which is rotating in a straight-line direction or a line direction approximating a straight-line direction and in a reciprocating motion in order to cut the metal material with an appropriate depth in order to reach the feed holes; ant the step of removing the fine metal powder, generated by cutting the metal material, attached to the thin circular grindstone blade every time a slit groove is formed in the metal material.

In particular, the removing process of removing the fine metal attached to the thin circular grindstone blade is performed every time forming each slit groove of a straight-line shape or a line shape approximating a straight line is formed by cutting the metal material. To perform the removing process of removing the fine metal powder attached to the thin circular grindstone blade enables the method to cut the metal material in order to form the slit grooves while keeping the thin circular grindstone blade in the state where there is less fine metal powder. As a result, it is possible to prevent the slit grooves from having a zigzag line, not having a straight line or a line approximating a straight line, and to suppress the occurrence of the thin circular grindstone blade from sizing. It is certainly possible to prevent the occurrence of having the slit grooves being formed in a zigzag line and of the thin circular grindstone blade from seizing until the formation of all the slit grooves formed in a lattice arrangement is completed.

According to the method of producing the molding die of the present invention, it is possible to avoid breaking the thin circular grindstone blade in a cutting tool during the slit groove formation, and also to produce the honeycomb structure molding die having the slit grooves of a desired shape such as in a lattice arrangement.

Next, a description will now be given of a preferred embodiment of the present invention.

The method of producing the molding die according to the present invention has a preparation step, a feed hole formation step, and a slit groove formation step.

In the preparation step, the metal material (or a die material) is prepared, which has a feed hole formation surface in which the feed holes are formed and a slit groove formation surface in which the slit grooves are formed. The metal material or the die material is a flat disk shape, for example, made of one of high-speed tool steel, alloy tool steel, stainless, aluminum alloy, titanium, Inconel, HASTELLOY® (nickel alloy), Stellite, cemented carbide, and cermet.

In the feed hole forming step, the feed holes are formed in the feed hole formation surface of the metal material toward the slit groove formation surface with a depth which does not penetrate the metal material. The feed holes are formed by drill and the like. The depth of the drill (which is equal to the depth of each feed hole) can be selected from an optional depth according to a thickness of a molding die.

In the slit groove formation step, for example, the thin circular grindstone blade which is rotating, is moved from one end part to the other end part of the metal material in a straight line direction or a line direction approximating a straight line in order to cut the metal material. This cutting process is repeatedly performed in order to form the slit grooves in the slit groove formation surface with the feed holes formed in the feed hole formation surface and to form the slit grooves in a straight line shape or a line shape approximating a straight line. It is thereby possible to form the slit grooves of a straight line shape or a line shape approximating a straight line with a predetermined pitch, which intersect or approximately intersect each other at right angles.

That is, performing each cutting process described above can form the slit groove of a straight line shape communicating with a corresponding feed hole. Repeatedly performing such a cutting process can form a plurality of slit grooves of a straight line or a line approximating a straight line which intersect or approximately intersect each other at right angles in a lattice arrangement.

The method according to the present invention can use the thin circular grindstone blade of a thickness within a range of 30 to 300 μm. Using the thin circular grindstone blade makes each slit groove of a width within a range of 30 to 300 μm formed in the slit groove formation surface of the metal material.

In the slit groove formation step, the removing process is performed. That is, the fine metal powder attached to the thin circular grindstone blade is removed every time the slit groove is formed by moving or shifting the thin circular grindstone blade which is rotating in a straight line direction or a line direction approximating a straight line.

In the process of removing the fine metal powder generated in the slit groove formation process, at least the outer peripheral edge part of the thin circular grindstone blade passes through the polishing grooves every time the slit groove is formed. This process can easily remove the fine metal powder attached to the thin circular grindstone blade.

Still further, in the process of removing the fine metal powder from the thin circular grindstone blade during the slit groove formation step, a dressing grindstone is disposed at one of an upstream side and a downstream side of the metal material in the moving direction of the thin circular grindstone blade.

The configuration in which the dressing grindstone is disposed on the upstream side observed from the metal material enables the slit groove to be formed in the slit groove formation surface of the metal material by moving or shifting the thin circular grindstone blade in a straight direction or a line direction approximating a straight line after at least the outer peripheral edge part of the thin circular grindstone blade passes through the polishing (or grinding) grooves formed in the dressing grindstone.

On the contrary, the configuration in which the dressing grindstone is disposed at the downstream side observed from the metal material enables the slit groove to be formed in the slit groove formation surface of the metal material by moving or shifting the thin circular grindstone blade in a straight direction or a line direction approximating a straight line, and at least the outer peripheral edge part of the thin circular grindstone blade then passes through the polishing (or grinding) grooves formed in the dressing grindstone.

Further, the configuration in which a pair of the dressing grindstones are disposed at both the upstream side and the downstream side observed from the metal material enables the slit groove to be formed in the slit groove formation surface of the metal material by moving or shifting the thin circular grindstone blade in a straight direction or a line direction approximating a straight line before and after at least the outer peripheral edge part of the thin circular grindstone blade passes through the polishing (or grinding) grooves formed in the dressing grindstone.

Because every configuration described above can perform the cutting process and the removing process sequentially, it is possible to easily produce the honeycomb structure molding die in a short period of time.

According to another aspect of the present invention, it is preferable that the dressing grindstone used during the step of removing the fine metal powder has a plurality of polishing grooves of a predetermined pitch which is equal to a pitch of the slit grooves to be formed in the metal material. Using the dressing grindstone having the above equal pitch can eliminate the process of aligning the polishing (or grinding) grooves formed in the dressing grindstone with the slit grooves formed in the slit groove formation surface of the metal material every time the cutting process is performed. It is therefore possible to easily produce the honeycomb structure molding die.

According to another aspect of the present invention, it is preferable that every time the step of forming the slit groove is performed, the slit groove has a length of 300 mm formed in the metal material.

If the cutting process makes the slit groove which exceeds 300 mm, that is, if the travel distance of the thin circular grindstone blade in the metal material exceeds 300 mm every time the cutting process is performed, there is a possibility that the fine metal powder generated by cutting the metal material and is then attached to the thin circular grindstone blade will not be adequately removed. Even if the fine metal powder attached to the thin circular grindstone blade is removed, there is still an issue which arises from the large amount of fine metal powder generated while the metal is being cut, this issue being the negative influence the fine metal powder has on the metal as the cutting process occurs. It is therefore preferable to form the slit groove of a length of less than 40 mm, more preferably, a length of not more than 30 mm.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
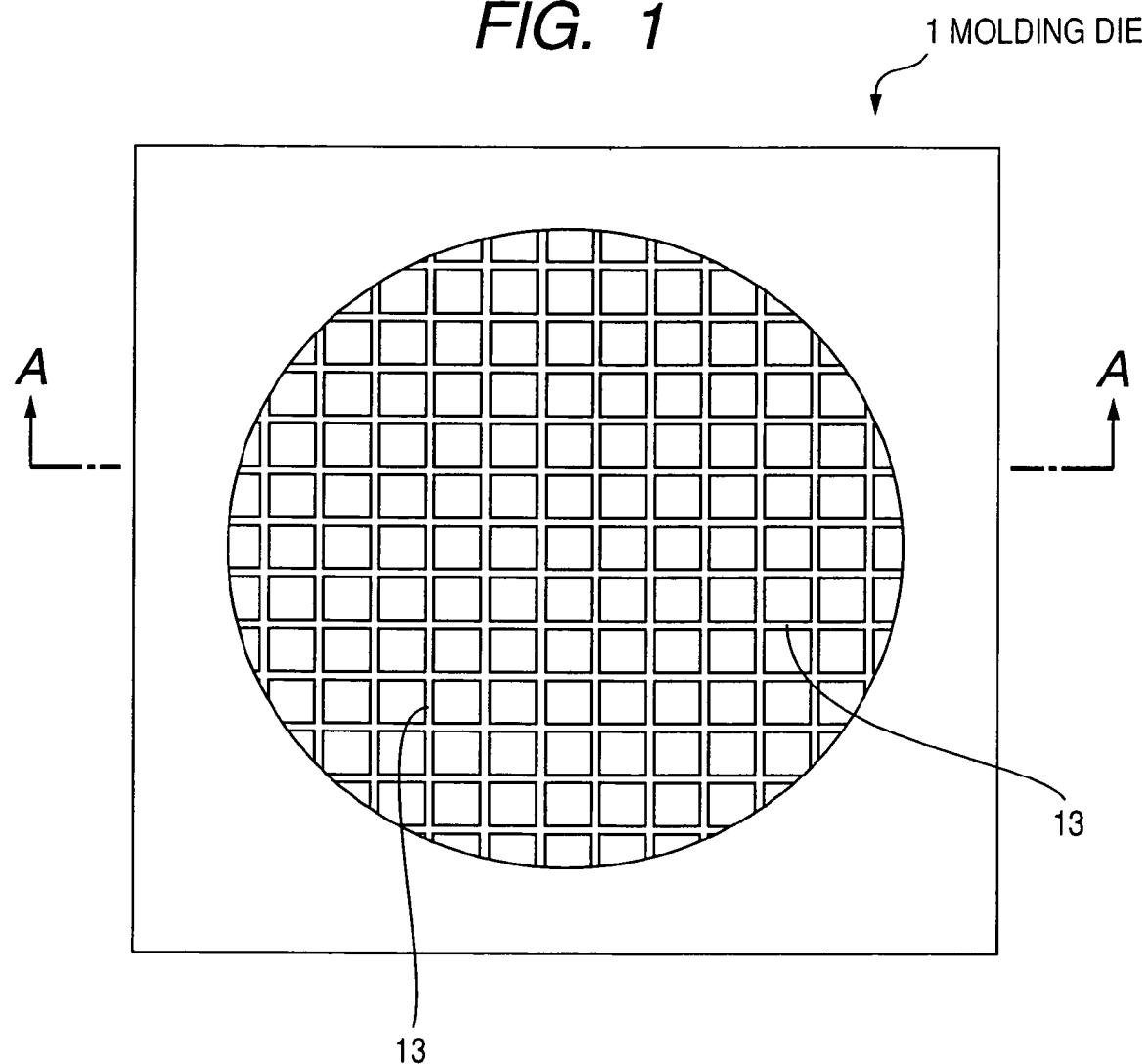
FIG. 1 is an explanatory view of a honeycomb structure molding die produced by the method according to a preferred embodiment of the present invention, observed from a slit groove formation side of the molding die designed to form a honeycomb structure body.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the method of producing or machining a honeycomb structure molding die (hereinafter, referred to as the "molding die" for short) for the use of producing a honeycomb structure body according to a preferred embodiment of the present invention with reference to FIG. 1 to FIG. 9.

The method according to the embodiment produces a molding die 1 such as an extrusion die for the use of producing a honeycomb structure body from molding material such as a ceramic raw material employed as a catalyst carrier of an exhaust gas purifying filter for motor vehicles.

Figure 2:
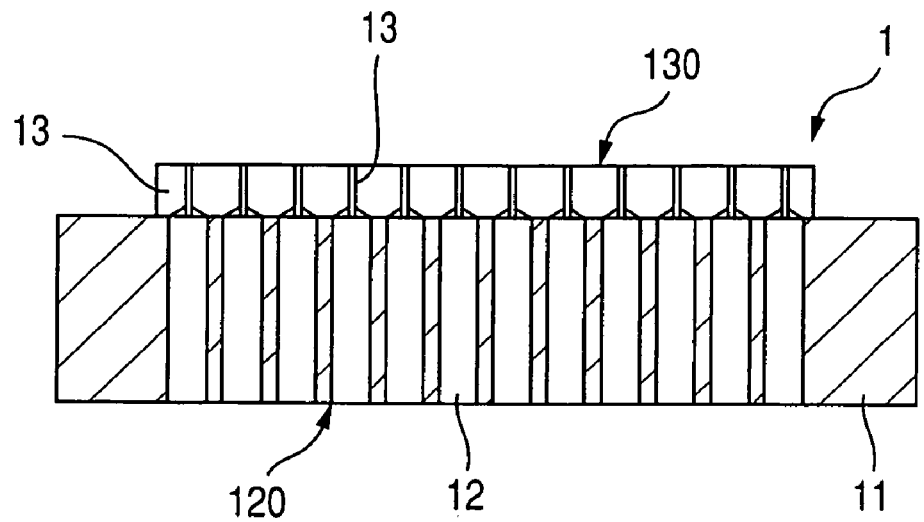
FIG. 2 is a sectional view of the molding die produced by the method according to the embodiment observed along A-A arrow line in FIG. 1.

FIG. 1 is an explanatory view of the molding die 1 produced by the method according to a preferred embodiment of the present invention, observed from a slit groove formation side of the molding die 1 designed to form a honeycomb structure body. FIG. 2 is a sectional view of the molding die 1 produced by the method according to the embodiment observed along A-A arrow line in FIG. 1.

As shown in FIG. 1 and FIG. 2, the molding die 1 has a plurality of feed holes 12 and a plurality of slit grooves (as thin grooves or slots) 13.

Through the feed holes 12 the molding material is fed or supplied. The slit grooves 13 are formed in a lattice arrangement in the molding die 1 and communicated with the corresponding feed holes 12. The honeycomb structure body is produced using the molding die 1 having the feed holes 12 and the slit grooves 13.

The method of producing or machining the molding die 1 according to the embodiment has a preparation step, a feed hole formation step, and a slit groove formation step.

Figure 3:
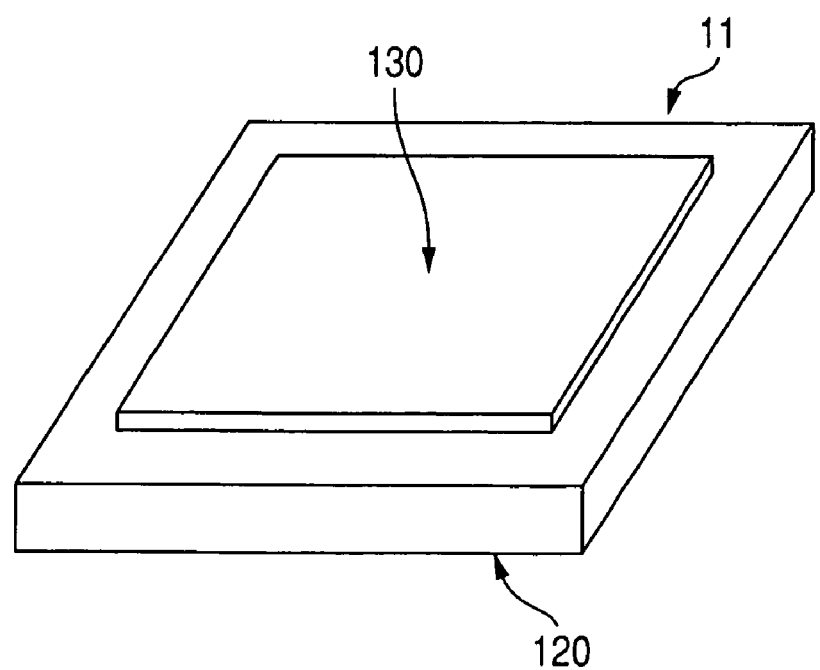
FIG. 3 is a perspective view showing the entire of metal material (or a die material) with which the molding die is produced by the method according to the embodiment.

FIG. 3 is a perspective view showing the all of the metal material 11 (or a die material) with which the molding die 1 is produced by the method according to the embodiment.

In the preparation step, as shown in FIG. 3, the metal material 11 is prepared. The feed holes 12 are then formed on a feed hole formation surface (as a first surface) 120 of the metal material 11. Following, the slit grooves 13 are formed on the slit groove formation surface 130 (as a second surface) of the metal material 11.

Figure 4:
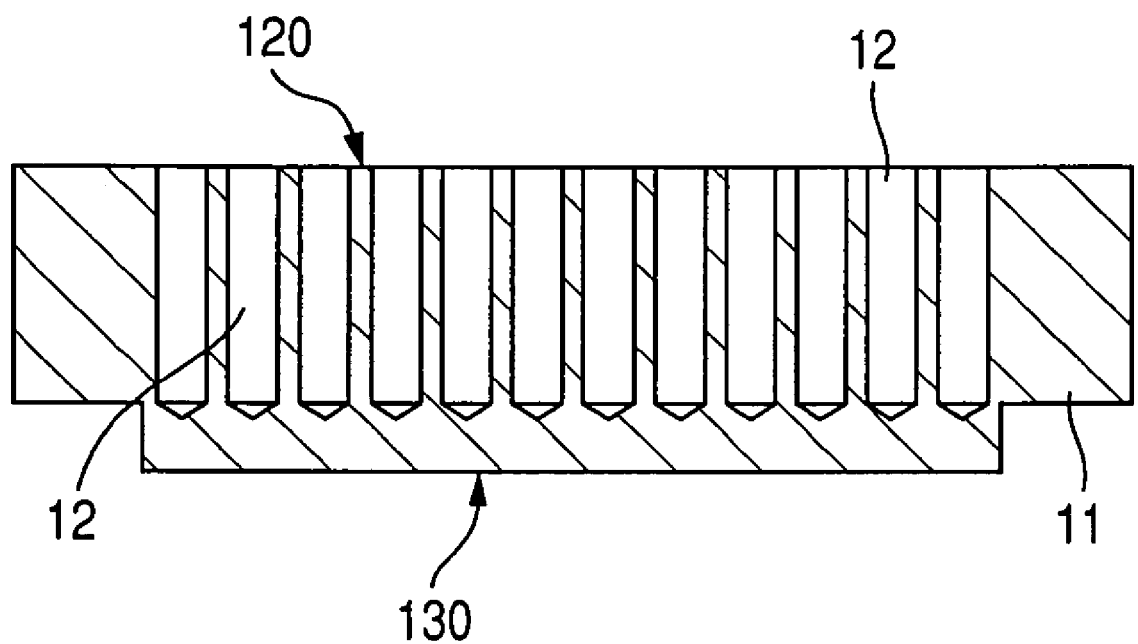
FIG. 4 is a sectional view of the metal material for the use of producing the molding die, in which feed holes are formed by the method according to the embodiment of the present invention.

FIG. 4 is a sectional view of the metal material 11 for the use of producing the molding die 1, in which feed holes 12 are formed by the method according to the embodiment of the present invention.

As shown in FIG. 4, in the feed hole formation step, the feed holes 12 are formed in the metal material 11 from the feed hole formation surface 120 toward the slit groove formation surface 130, in which the feed holes 12 do not penetrate the metal material 11. That is, the feed holes 12 has a predetermined depth which does not reach the slit groove formation surface 130 in the metal material 11 so as not to pass the feed holes 12 through the metal material 11.

Figure 5A:
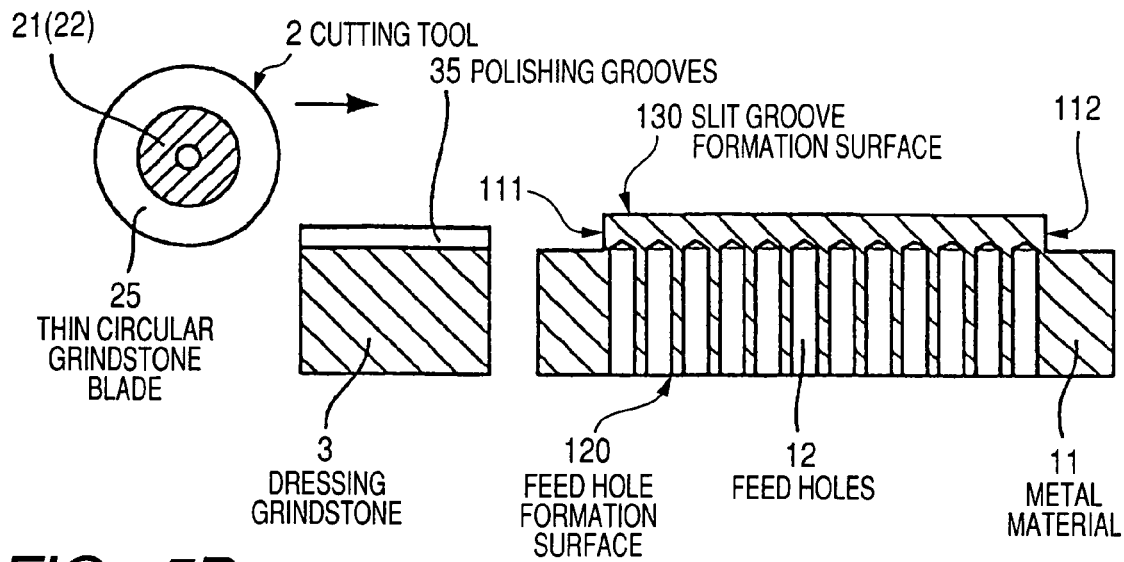
FIG. 5A is a view explanatory showing a cross section of the metal material parallel to the slit groove forming direction, where a thin circular grindstone blade of a cutting tool is placed at the upstream side of a dressing grindstone disposed at the left side of the metal material.
Figure 5B:
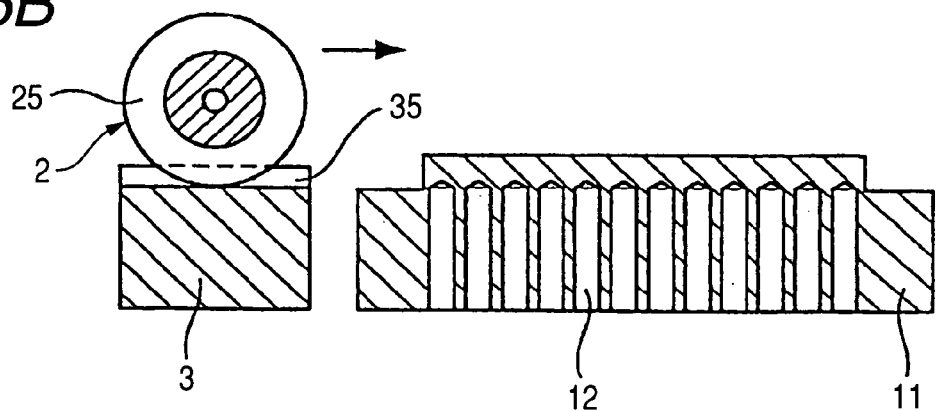
FIG. 5B is a view explanatory showing the cross section of the metal material parallel to the slit groove forming direction, where the thin circular grindstone blade of the cutting tool is placed in polishing grooves in the dressing grindstone in the slit groove formation process.
Figure 5C:
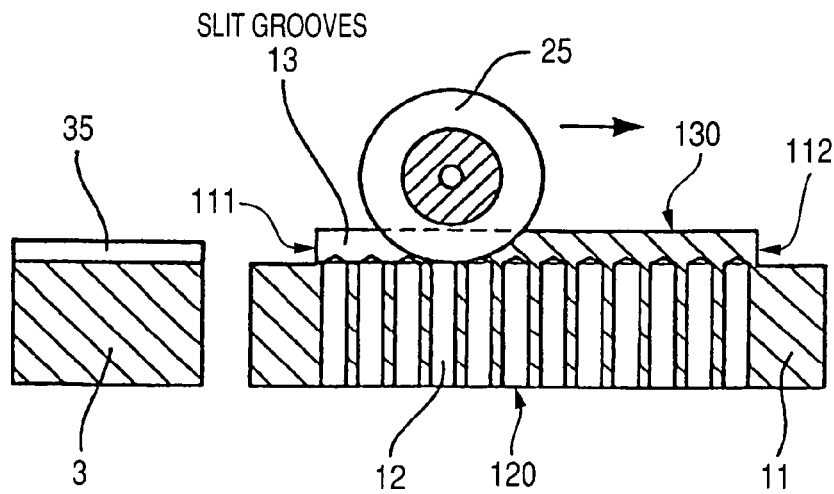
FIG. 5C is an explanatory view showing the cross section of the metal material parallel to the slit groove formation direction, where the thin circular grindstone blade of the cutting tool is cutting the metal material in the slit groove formation process.

Following, in the slit groove formation step, as shown in FIG. 5A to FIG. 5C, the metal material 11 is cut from the slit groove formation surface 130 side using a thin circular grindstone blade 25 in a cutting tool 2, which is rotating, while moving or shifting it in reciprocating motion in straight-line direction or a direction approximating a straight-line direction. Such a cutting process is repeatedly carried out in order to form a plurality of slit grooves 13 of a straight line shape or a line shape approximating a straight line in the feed hole formation surface 120 so as to communicate them with the corresponding feed holes 12. This cutting process can form a plurality of slit grooves 13, which intersects or approximately intersects each other at right angles, in an approximate lattice shaped configuration with a predetermined pitch.

Thus, the slit grooves 13 are formed in the slit groove formation surface 130 of the metal material 11 so that the slit grooves 13 are cut to the depth communicating with the feed holes 12 by means of the thin circular grindstone blade 25 having a thickness within a range of 30 to 300 μm. In particular, a given number of the horizontal slit grooves 13 are formed along linear arrays of the feed holes 12 arranged in one direction, after which a given number of the vertical slit grooves 12 are formed along linear arrays of the feed holes 12 arranged in the other direction. Both the directions are approximately intersecting each other at right angles Further, in the slit groove formation step, fine metal powder produced by cutting the metal material 11 is generated every time the cutting process is performed and is then attached to the thin circular grindstone blade 25. In the method of the embodiment of the present invention, the fine metal powder attached to the thin circular grindstone blade 25 in the cutting tool 2 is removed every time the cutting process is performed, namely, forming the slit groove 13 of a straight line shape or a line shape approximating a straight line, as shown in FIG. 5A to FIG. 5C.

The honeycomb structure molding die 1 having the configuration shown in FIG. 1 and FIG. 2 is made by the steps described above in the method of the embodiment according to the present invention, where the molding die 1 is composed of the feed holes 12 and the slit grooves 13 arranged in an approximate lattice arrangement, and the slit grooves 13 are communicated with the corresponding feed holes 12.

Next, a description will now be given of a detailed explanation of the steps in the method of producing or machining the honeycomb structure molding die 1.

<Preparation Step>

As shown in FIG. 3, the metal material 11 having the feed hole formation surface 120 (as the first surface) and the slit groove formation surface 130 (as the second surface) is prepared. An SKD61 steel plate is used as the metal material 11. As shown in FIG. 3, the slit groove formation surface 130 which is projected as compared with the peripheral part of the metal material 11 is formed in advance.

<Feed Hole Formation Step>

Next, as shown in FIG. 4, the feed holes 12 are formed on the feed hole formation surface 120 of the metal material 11 with a predetermined depth. In the method according to the embodiment of the present invention, the feed holes 12 are made, using a super-hard drill or a carbide drill, in the feed hole formation surface 120 with a predetermined depth which does not reach the opposite surface, namely, the feel groove formation surface 130. That is, the feed holes 12 are not penetrated in the metal material 11.

As shown in FIG. 4, each feed hole 12 has the depth of slightly reaching the bottom part of the slit groove formation surface 130. At this time, the feed holes 12 does not penetrate the metal material 11. That is, the feed hole formation surface 120 is not completely communicated with the slit groove formation surface 130 through the feed holes 12.

<Slit Groove Formation Step>

FIG. 5A is an explanatory view showing a cross section of the metal material 11 parallel to the slit groove forming direction, where the thin circular grindstone blade 25 of the cutting tool 2 is placed at the upstream side of the dressing grindstone 3 disposed at the left side of the metal material 11. FIG. 5B is an explanatory view showing the cross section of the metal material 11 parallel to the slit groove forming direction, where the thin circular grindstone blade 25 of the cutting tool 2 is placed in polishing (or grinding) grooves 35 formed in the dressing grindstone 3 in the slit groove formation process. FIG. 5C is an explanatory view showing the cross section of the metal material 11 parallel to the slit groove formation direction, where the thin circular grindstone blade 25 of the cutting tool 2 is cutting the metal material 11 in the slit groove formation process.

As shown in FIG. 5A to FIG. 5C, the slit grooves 13 are formed by cutting the slit groove formation surface 130 side using the thin circular grindstone blade 25 of the cutting tool 2 so that the slit grooves 13 has a predetermined depth in order to communicate the slit grooves 13 with the corresponding feed holes 12 in the metal material 11.

Figure 6:
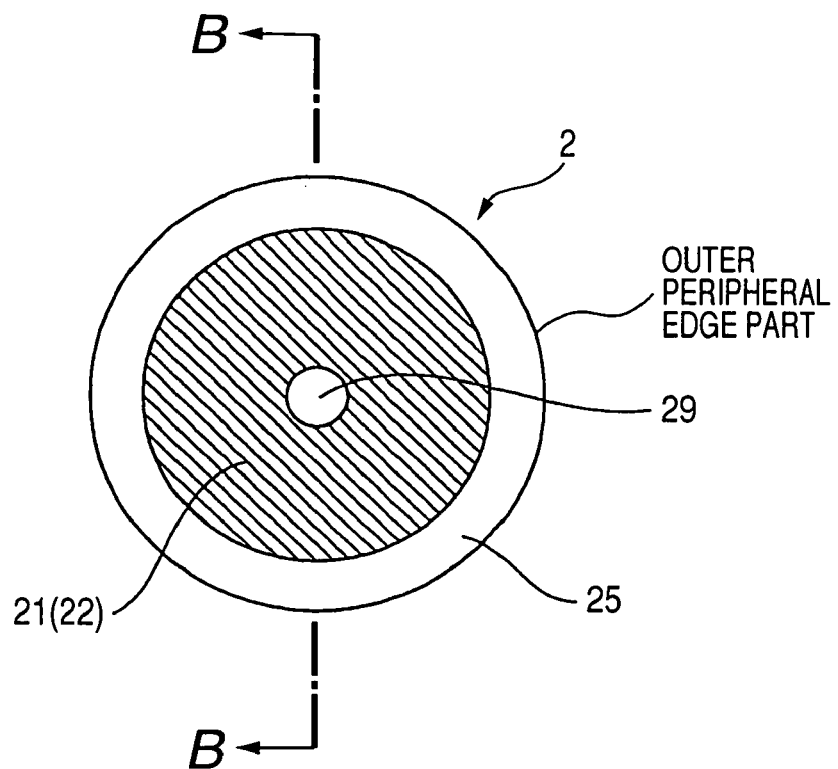
FIG. 6 is a view showing the cutting tool equipped with the thin circular grindstone blade for the use of making the slit grooves in the molding die according to the embodiment of the present invention.
Figure 7:
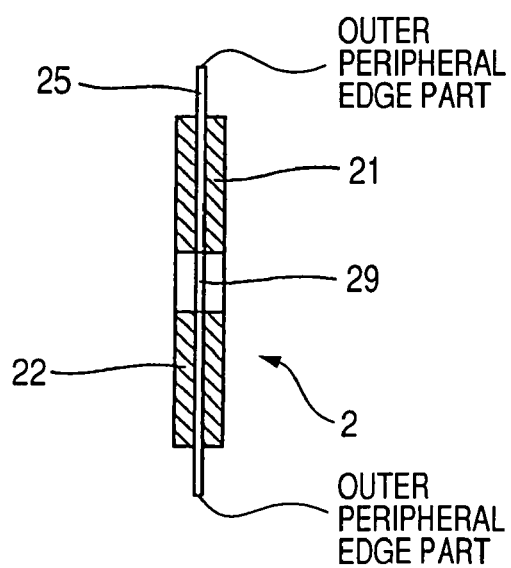
FIG. 7 is an explanatory view showing the cutting tool observed along B-B arrow line in FIG. 6.

FIG. 6 is a sectional view showing the cutting tool 2 equipped with the thin circular grindstone blade 25 for the use of cutting a plurality of slit grooves 13 in the slit groove formation surface of the molding die 1. FIG. 7 is an explanatory view showing the cutting tool 2 observed along B-B arrow line in FIG. 6.

The thin circular grindstone blade 25 in the cutting tool 2 has a thickness within a range of 30 to 300 μm. Using the thin circular grindstone blade 25 makes each slit groove 13 of a width within a range of 30 to 300 μm formed in the slit groove formation surface 130 of the metal material 11.

As shown in FIG. 6 and FIG. 7, the cutting process is carried out using the cutting tool 2 equipped with the thin circular grindstone blade 25 which is placed between circular shaped flanges 21 and 22. The cutting tool 2 is forcedly fixed to a rotary machine such as an electric motor (omitted from the diagrams). The cutting tool 2 has a hole 29 through which a rotary shaft of the rotary machine is inserted and tightly fixed.

Figure 8:
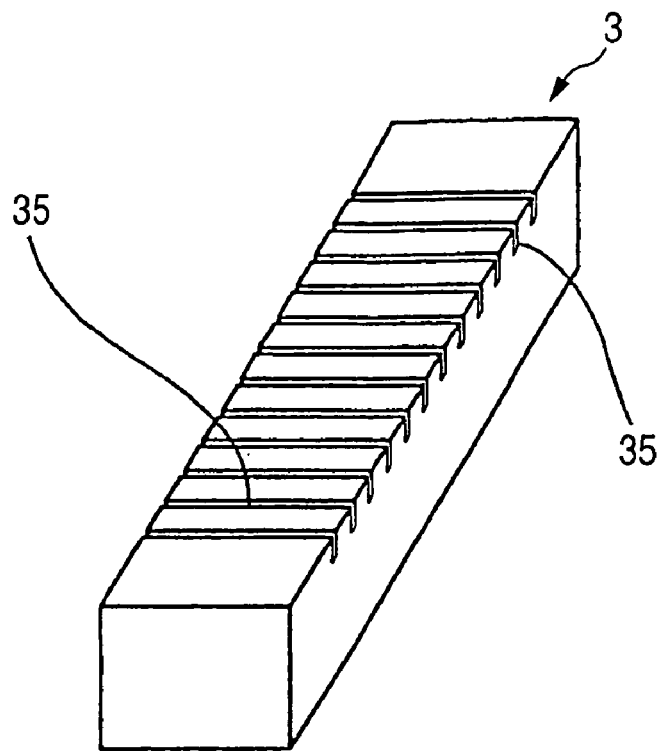
FIG. 8 is a perspective whole view showing the dressing grindstone for the use in the method of producing the honeycomb structure molding die according to the embodiment of the present invention.

FIG. 8 is a perspective whole view showing the dressing grindstone 35 for the use in the method of producing the honeycomb structure molding die according to the embodiment of the present invention.

As shown in FIG. 8, the slit groove formation step in the method of producing the honeycomb structure molding die 1 according to the embodiment uses the dressing grindstone 3. The dressing grindstone 3 has a plurality of polishing (or grinding) grooves 35 formed in one surface thereof. The polishing grooves 35 are formed with a same pitch of the slit grooves formed in the die 1.

During the slit groove formation step, as shown in FIG. 5A to FIG. 5C, the dressing grindstone 3 is placed at the upstream side (or the left side) of the metal material 11 to be processed and in the forward direction of the cutting tool 2 equipped with the thin circular grindstone blade 25. This configuration enables at least the outer peripheral edge part of the thin circular grindstone blade 25 in the cutting tool 2 to pass through the polishing grooves 35 of the dressing grindstone 3 before making the slit grooves 13 of a straight line shape or a line shape approximating a straight line in the metal material 11.

In a concrete example, as shown in FIG. 5A and FIG. 5B, the thin circular grindstone blade 25 in the cutting tool 2 is moved or shifted in a straight line direction or a line direction approximating a straight line in order that at least the outer peripheral edge part of the thin circular grindstone blade 25 passes in the polishing grooves 35 of the dressing grindstone 3.

Next, as shown in FIG. 5C, the thin circular grindstone blade 25 of the cutting tool 2 is moved to the slit groove formation surface 130 of the metal material 11 from one end part 111 of the metal material 11 after polishing (or grinding) the outer peripheral edge part of the thin circular grindstone blade 25 using the polishing grooves 35. The thin circular grindstone blade 25 of the cutting tool 2 is moved or shifted to the other end part 112 of the metal material 11 while cutting the slit groove formation surface 130 of the metal material 11 with a predetermined depth which reaches the feed holes 12 using the thin circular grindstone blade 25 which is rotating. This can form the slit grooves 13 of a straight-line shape or a line shape approximating a straight line in the moving (or shifting) direction of the thin circular grindstone blade 25.

Next, the thin circular grindstone blade 25 of the cutting tool 2 is returned to the original position at the upstream side of the dressing grindstone 3 shown in FIG. 5A while passing through the polishing grooves 35 formed in the dressing grindstone 35. The above process is repeatedly performed in order to form a plurality of slit grooves 13 in a lattice arrangement in the slit groove formation surface 130 of the metal material 11 shown in FIG. 1. That is, the slit grooves 13 are formed in a lattice arrangement approximately intersecting each other at right angles.

Following this step, the peripheral part of the slit groove formation surface 130 is worked in a circular shape as shown in FIG. 1. The production of the molding die 1 shown in FIG. 1 and FIG. 2 for the use of molding the honeycomb structure body is thereby completed.

Next, a description will now be given of the action and effects of the method of producing the honeycomb structure molding die 1 according to the embodiment of the present invention.

In the slit groove formation step of the embodiment, as shown in FIG. 5C, the thin circular grindstone blade 25 in the cutting tool 2, which is rotating, is moved or shifted in a straight-line direction or a line direction approximating a straight line from the one end part 111 to the other end part 112 of the metal material 11. This cutting process of making the slit grooves 13 in a straight line direction or a line direction approximating a straight line is repeatedly carried out. Thereby, the slit grooves 13, having the depth of reaching the feed holes 12 and approximately intersecting each other at right angles, are formed in the slit groove formation surface 130 with a predetermined pitch in the metal material 11. As a result, the slit grooves 13 are thereby formed in approximately a lattice arrangement with a predetermined pitch.

In the method of the embodiment shown in FIG. 5A to FIG. 5C, at least the outer peripheral edge part of the thin circular grindstone blade 25 in the cutting tool 2 is passed into the polishing grooves 35 formed in the dressing grindstone 3 in order to polish or grind the thin circular grindstone blade 25 every time the thin circular grindstone blade is shifted from the one end part 111 to the other end part 112 of the metal material 11. This can remove the fine metal powder, generated by cutting the metal material 11, attached to the thin circular grindstone blade 25 every time the metal material 11 is cut in order to form the slit grooves 13 by moving or shifting the thin circular grindstone blade 25 in a straight line direction or a line direction approximating a straight line from the one end part 111 to the other end part 112 of the metal material 11.

Figure 9:
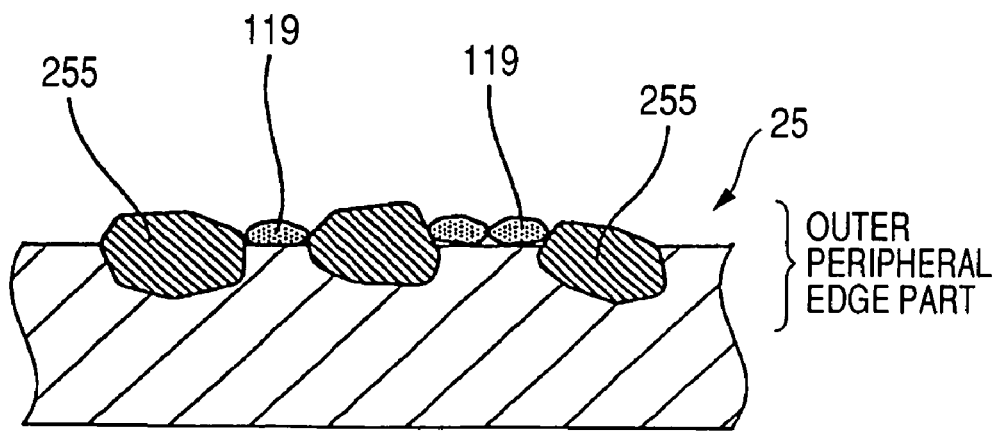
FIG. 9 is an enlarged view partially showing an outer peripheral edge part of the thin circular grindstone blade in the cutting tool where the fine metal powder generated by cutting the metal material is attached between grinding particles of the thin circular grindstone blade in the cutting tool.

FIG. 9 is a partially enlarged view showing an outer peripheral edge part of the thin circular grindstone blade 25 in the cutting tool 2 where fine metal powder 119 generated by cutting the metal material 11 is attached between grinding particles 255 of the thin circular grindstone blade 25 in the cutting tool 2.

That is, as shown in FIG. 9, each process of cutting the metal material 11 generates fine metal powder 119, and the fine metal powder 119 generated is attached between the grinding particles 255 embedded in the outer peripheral edge part of the thin circular grindstone blade 25. In the method according to the embodiment of the present invention, the fine metal powder 119 can be removed from the thin circular grindstone blade 25 every time the cutting process is performed. Accordingly, it is possible to carry out the cutting process while keeping the amount of fine metal powder on the thin circular grindstone blade 25 to an acceptably low amount. As a result, this can suppress the thin circular grindstone blade 25 of the cutting tool 2 from being moved or shifted in a zigzag direction, and suppress the occurrence of the thin circular grindstone blade 25 from seizing. It is therefore possible to form a plurality of slit grooves 13 in approximately a lattice arrangement by repeatedly performing the cutting process shown in FIG. 5A to FIG. 5C, and possible to prevent the slit grooves 13 formed in a zigzag line in the molding die 1.

Therefore the method of producing the honeycomb structure molding die 1 according to the embodiment of the present invention can prevent the occurrence of breaking the thin circular grindstone blade 25 of the cutting tool 2 and of seizing of the thin circular grindstone blade 25 during the slit groove formation step, and thereby producing the molding die 1 for the use of producing the honeycomb structure body having a plurality of slit grooves of a desired shape.

Still further, according to the embodiment of the present invention, as shown in FIG. 5B, at least the outer peripheral edge part of the thin circular grindstone blade 25 in the cutting tool 2 passes through the polishing grooves 35 formed in the surface of the dressing grindstone 3 in order to remove the fine metal powder 119 generated by cutting the metal material 11. It is therefore possible to easily remove the fine metal powder 119 attached to the thin circular grindstone blade 25 of the cutting tool 2.

Still further, in the process of removing the fine metal powder 119, the dressing grindstone 3 is placed at the upstream side (at the left side shown in FIG. 5A to FIG. 5C) of the metal material 11 in the forward direction of the thin circular grindstone blade 25 in the cutting tool 2. Accordingly, after at least the outer peripheral edge part of the thin circular grindstone blade 25 passes through the slit grooves 35 of the dressing grindstone 3, the cutting process can be continuously performed by moving or shifting the thin circular grindstone blade 25 in the cutting tool 2 to the metal material 11 (see FIG. 5A to FIG. 5C). It is possible to produce the molding die 1 for the use of molding the honeycomb structure body with simple work and at short time.

Moreover, the dressing grindstone 3 has a plurality of polishing grooves 35 in the surface thereof. The polishing grooves 35 are formed with a predetermined pitch which is equal to the pitch of the slit grooves 13 formed in the metal material 11 (see FIG. 1 and FIG. 8). Accordingly, as shown in FIGS. 5A to 5C, because it is not necessary to coincide the position of the polishing grooves 35 of the dressing grindstone 3 with the slit groove 13 to be formed, this can easily produce the molding die 1 for the use of molding the honeycomb structure body.

The slit groove formation process according to the embodiment makes the slit grooves 13 of not more than 300 mm in each cutting process. Accordingly, it is possible to adequately remove the fine metal powder 119, generated in the cutting process and is then attached to the thin circular grindstone blade 25, every time the polishing process using the polishing grooves 35 formed in the dressing grindstone 3 after or before the cutting process is performed.

Further, the method according to the embodiment of the present invention can suppress the occurrence of forming the slit grooves in a zigzag direction caused by a larger amount of the fine metal powder attached to the thin circular grindstone blade 25 and can also suppress the occurrence of generating thermal energy by friction.

As described above in detail, according to the embodiment of the present invention, it is possible to prevent the occurrence of breaking the thin circular grindstone blade during the slit groove formation step and to produce the molding die for the use of molding the honeycomb structure body having the slit grooves of a desired shape.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A method of producing a honeycomb structure molding die for the use of molding a honeycomb structure body, the die having a plurality of feed holes through which molding material is fed and a plurality of slit grooves formed in approximating a lattice arrangement communicated with the corresponding feed holes, the method comprising steps of:

preparing a metal material of a plate shape having a feed hole formation surface in which the feed holes are formed and a slit groove formation surface in which the slit grooved are formed;

forming the feed holes with a depth in the feed hole formation surface toward the slit groove formation surface of the metal material without penetrating the metal material;

forming the slit grooves of a straight-line shape or a line shape approximating a straight line in the slit groove formation surface of the metal material in approximating a lattice arrangement while moving a thin circular grindstone blade which is rotating in a straight-line direction or a line direction approximating a straight line and in reciprocating motion in order to cut the metal material with a depth of reaching the fed holes; and removing fine metal powder, generated by cutting the metal material, attached to the thin circular grindstone blade every time the slit groove is formed in the metal material, wherein;

the step of removing the fine metal powder uses a dressing grindstone in which a plurality of polishing grooves are formed, and at least the outer peripheral edge part of the thin circular grindstone blade is passed through the polishing grooves every time the slit groove is formed, in the step of removing the fine metal powder from the thin circular grindstone blade, the dressing grindstone is placed at an upstream side of the metal material in the moving direction of the thin circular grindstone blade, and the dressing grindstone used during the step of removing the fine metal powder has a plurality of polishing grooves of a predetermined pitch, said predetermined pitch being equal to a pitch of the slit grooves to be formed in the metal material.

2. The method of producing the honeycomb structure molding die according to claim 1, wherein every time the step of forming the slit groove is performed, the slit groove has a length of not more than 300 mm formed in the metal material.

3. The method of producing the honeycomb structure molding die according to claim 1, wherein the method uses the thin circular grindstone blade with a thickness within a range of 30 to 300 μm.

4. The method of producing the honeycomb structure molding die according to claim 1, wherein the method uses as the metal material which is selected from one of high-speed tool steel, alloy tool steel, stainless, aluminum alloy, titanium, Inconel, HASTELLOY®, Stellite, cemented carbide, and cermet.

* * * * *